W. B. GAROUTTE.
Corn-Planter.
No. 165,322.  Patented July 6, 1875.
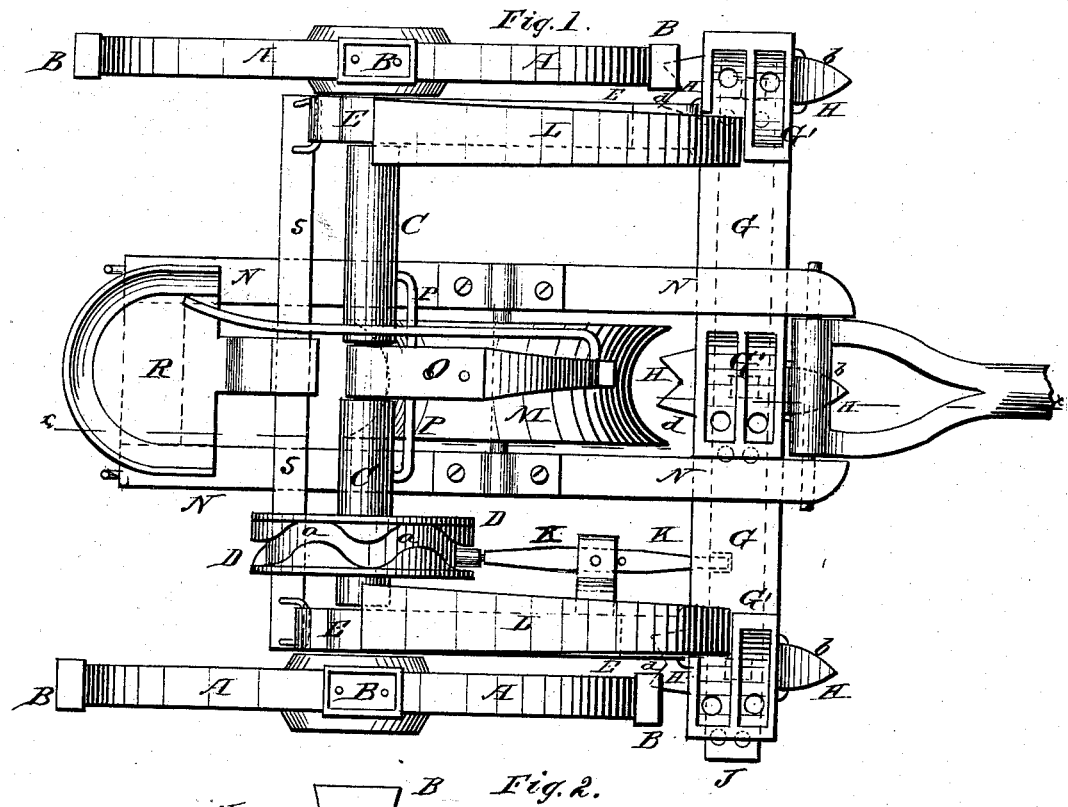
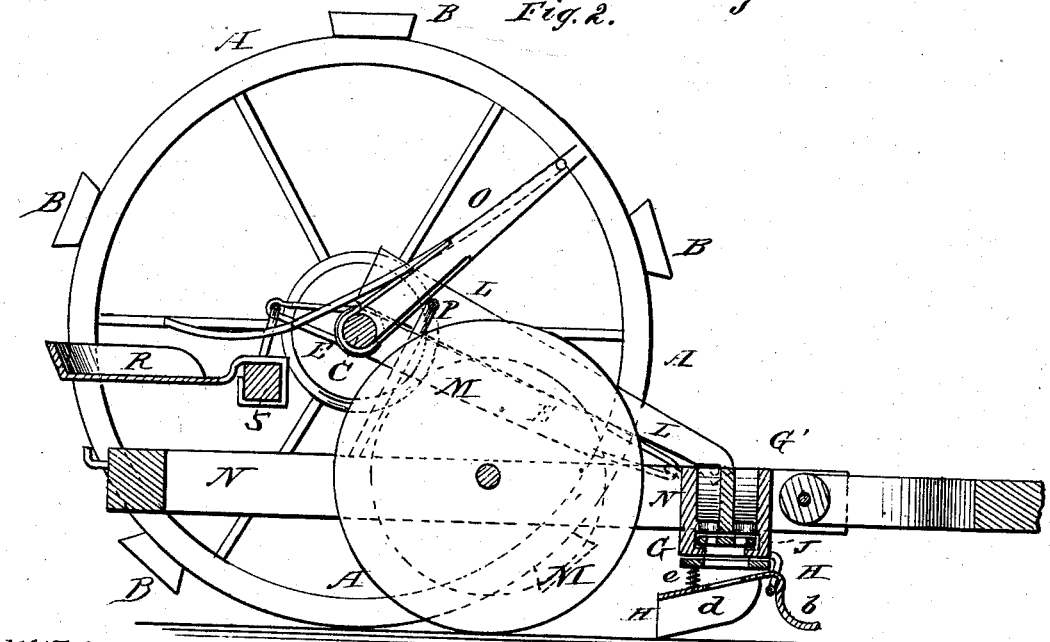
WITNESSES.
P. C. Dieterich
W. C. McArthur
INVENTOR:
W. B. Garoutte
per
J. H. Alexander
ATTORNEY.

UNITED STATES PATENT OFFICE.

WILLIAM B. GAROUTTE, OF SPRINGFIELD, MISSOURI.

IMPROVEMENT IN CORN-PLANTERS.

Specification forming part of Letters Patent No. 165,322, dated July 6, 1875; application filed May 1, 1875.

*To all whom it may concern:*

Be it known that I, W. B. GAROUTTE, of Springfield, in the county of Greene and State of Missouri, have invented certain new and useful Improvements in Corn-Planters, Fertilizers, and Markers; and I do hereby declare that the following is a full, clear, and exact description thereof, reference being had to the accompanying drawings, and to the letters of reference marked thereon, which form part of this specification.

The nature of my invention consists in the construction and arrangement of a corn-planting, fertilizing, and marking machine, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 is a central vertical section on line $x\ x$, Fig. 1.

A A represent two wheels of sufficient size to measure the ground correctly, and provided with flaring boxes B B, attached to their surfaces the distance apart the rows are desired. These wheels are firmly secured on the axle C, upon which is also secured a small wheel, D, formed with a zigzag groove, $a$, on its periphery, said wheel being so arranged and adjusted as to drop immediately under the pressing-boxes. The axle C is, by side braces E E, connected to a cross-beam, G, on which are hung three combined plows, H H. Each of these plows consists of a center furrow-opener, $b$, and two side-coverers, $d\ d$, to bring the ground from the sides upon the corn. At the rear of each plow H, between it and the beam G, is a spring, $e$, to enable the plow to adjust itself to any unevenness in the ground. Over each plow, on top of the beam, is secured a box, G', divided longitudinally in two apartments, one for corn and the other for fertilizer, which are dropped by means of a perforated slide, J, and this slide is operated by a pivoted lever, K, the rear end of which works in the zigzag groove $a$ on the wheel D, and is oscillated thereby. L L are fertilizer-boxes, resting mainly upon the axle $c$, and their lower ends opening into the proper compartment of the boxes G'. The beam G and plows attached thereto are carried by a center wheel, M, on two side-beams, N N, extending back to enable the driver to gage the depth of planting. Upon this center wheel are also made to rest the measuring-wheels A A in turning, and while being adjusted in proper place. This is done by means of a lever, O, connected by a strap-hinge with the axle, and made to operate on a bail, P, attached to the beams N N, so as to raise the axle $c$ and wheels A A. If the frame of the machine is made wide enough to plant three rows at one time, I place a seed-box in front of the wheel M, as shown in Fig. 1. In that case the corn dropped from the center box will be covered by the concave wheel M. The driver's seat R is placed on a swinging cross-beam, S, attached to the rear ends of the side beams E E, so as to swing back and forward for adjusting the balance.

Having thus fully described my invention, what I claim as new, and desire to secure by Letters Patent, is—

1. The wheels A A, provided upon their periphery with the pressing-boxes B B, said boxes arranged at regular intervals, to operate as and for the purpose set forth.

2. The wheel D, with zigzag grooves $a$, combined with axle C and wheels A A, having boxes B B, all arranged to deliver the grain, substantially in the manner set forth.

3. The plow H, constructed to form opener $b$ and coverer $d\ d$, and arranged to have a tilting or rocking motion, substantially as herein described.

4. In a corn-dropper, the wheels A A, having boxes B B, axle C, wheel D, with its zigzag groove $a$, center wheel M, lever O, and bail P, all constructed and arranged as herein set forth.

In testimony that I claim the foregoing as my own I affix my signature in presence of two witnesses.

WILLIAM B. GAROUTTE.

Witnesses:
E. D. OTT,
F. H. WARREN.